UNITED STATES PATENT OFFICE.

FRANKLIN W. KREMER, OF CARLSTADT, NEW JERSEY.

LEATHER COMPOUND.

1,065,691. Specification of Letters Patent. Patented June 24, 1913.

No Drawing. Application filed July 31, 1912. Serial No. 712,549.

*To all whom it may concern:*

Be it known that I, FRANKLIN W. KREMER, a citizen of the United States, residing at Carlstadt, in the county of Bergen and State of New Jersey, have invented a new and useful Leather Compound, of which the following is a specification.

This invention relates to a leather and rubber substitute and the method of making the same, the substitute being particularly intended for use in manufacturing horse pads, although it can be used for many other purposes with equally good results.

Prior to my present invention, so far as I am aware, the art possessed no horse pad material which was entirely satisfactory.

Leather was the nearest approach to an ideal horse pad material. Its advantages, however, were tempered with disadvantages. While it was advantageous because it was tough and strong and did not heat up the horse's hoof, it was disadvantageous in that it would soften and swell when wet and shrink and harden subsequently when dried; and, moreover, it required to be sewed or cemented or otherwise secured in some expensive and unreliable manner to the soft rubber heel or calk of the horse pad.

Rubber, or rubber compositions, or layers of rubber and canvas, such as have been proposed as material for horse pads, are open to the objection that they heat or draw the horse's hoof, and that they also lack strength and wearing qualities, and are usually elastic and compressible, and consequently produce a cushion action which causes the shoe or pad to work loose.

The object of the present invention is to overcome the disadvantages of prior pad materials, as above set forth, and to provide a product which is suitable for the purpose in view.

With the foregoing and other objects, which will appear as the description proceeds, the invention resides in a composition of matter which I have produced after years of experiment and which is leather-like, tough, incompressible so as not to produce a cushion effect, puncturable by soft nails such as horse shoe nails, inelastic and thus incapable of being bulged upward against the frog of the hoof, approximately as non-heating as leather, unaffected by successive wetting and drying, and capable of being connected by vulcanization to the soft rubber heel or calk.

The invention also resides in the method of producing said composition of matter.

In producing my composition of matter, I preferably employ the following ingredients in substantially the proportions specified:—

| | |
|---|---|
| Fine Pará rubber | 5 parts |
| Reclaimed rubber | 3 parts |
| Golden antimony | 5 parts |
| Lime | 1 part |
| Magnesia | 2 parts |
| Zinc oxid | 1 part |
| Rubber-saturated and coated cotton fibers | 19 parts |
| Sulfur | 5 parts |
| Total | 41 parts |

The above ingredients are suitably mixed into a batch and then run out into a sheet of suitable size and thickness. The sheet is stamped or cut out in shape of horse pads and each pad is then condensed and vulcanized under a pressure of approximately 2000 pounds for a period of 40 minutes.

Where it is desired to produce a composition of matter having even greater heat-resisting qualities than the above described compound, I prefer to employ about two parts of shredded or defibered asbestos, the fibers of which may be either natural or rubber saturated or coated. The two parts of asbestos are mixed into the above described batch so as to make a total of 43 parts instead of 41 parts.

It will be understood that the above described formula is merely illustrative, and that the ingredients entering into the compound, and their proportions, may be varied within the limits defined by the claims, without departing from the spirit of the invention.

In producing the ingredient of the above formula which is described as "rubber saturated and coated cotton fibers", I prefer to employ the best sea island cotton duck or canvas which has been thoroughly saturated and coated with rubber. This rubber saturated and coated fabric, I place in an ordinary friction mill and there de-fiber in such manner that the individual fibers are substantially uninjured and are thoroughly saturated and coated with rubber. By the term "vulcanizable" fibers I mean these rubber saturated and coated fibers and I term them "vulcanizable" fibers for the reason that their entire body is thoroughly permeated or saturated with rubber and they are, indeed, capable of being vulcanized to each other without the addition of other rubber as a binder, but in carrying out my invention I mix these vulcanizable fibers with other new and reclaimed rubber as set forth in the above formula.

In preparing the rubber saturated and coated fabric which I de-fiber in a friction mill in the manner above described, I prefer to proceed as follows: The sheet of canvas or duck which is to be rubber saturated and coated, is first thoroughly dried. For this purpose, it is run over heated rolls or calenders until by weight-test or otherwise, it is demonstrated that all, or practically all, of the moisture has been removed. This thorough drying is necessary on account of the hygroscopic qualities of the fine duck or canvas, and also by reason of the fact that it is desired to replace the moisture with rubber and that only by thoroughly drying the fabric can it be made to acquire the maximum saturation with rubber. The thoroughly dried fabric is conducted through a bath of liquid or dissolved rubber, and after leaving the bath is carried immediately between compressible squeezing rollers which serve to press the liquid rubber into the fabric in such manner that all of the fibers thereof are thoroughly saturated or permeated with rubber. The saturated fabric is then dried to remove the rubber solvents and is then rolled up. The rolls of fabric are then run through a rubber coating machine which serves to coat one or both sides of the fabric first with a "friction coating" and then with a "skim-coating" of rubber. The fabric which has thus been "frictioned" and "skim-coated", is then rolled up along with a suitable "liner", to prevent the coated surfaces from adhering to each other. This fabric is now ready to be put into the friction mill and de-fibered so as to produce the rubber-coated and saturated or "vulcanizable" fibers above described.

While the above described method of preparing the fabric to produce the "vulcanizable" fibers is the one I prefer, it will be understood that the fabric can be otherwise treated so long as the finished fibers are thoroughly permeated or saturated with rubber before they are put into the final compound.

The vulcanizable fibers when properly reduced are mixed with the new and reclaimed rubber, antimony, lime, magnesia, zinc oxid, and sulfur, in any suitable manner, to produce the batch which, as before explained, is subsequently run out in sheets, and cut or stamped in the shape of horse pads or other articles, which articles are then condensed and vulcanized under heavy pressure.

What is claimed is:—

1. A composition of matter for making horse pads and other articles comprising a vulcanized and condensed mixture of rubber and vulcanizable fibers.

2. A composition of matter for making horse pads and other articles comprising a vulcanized and condensed rubber compound having vulcanizable reinforcing fibers intimately mixed therethrough and vulcanized therewith.

3. A composition of matter for making horse pads and other articles, comprising a vulcanized and condensed mixture of new and reclaimed rubber, vulcanizable reinforcing fibers, antimony, lime, magnesia, and zinc oxid.

4. A composition of matter for making horse pads and other articles, comprising a vulcanized and condensed mixture of new and reclaimed rubber, vulcanizable reinforcing fibers, antimony, lime, magnesia, zinc oxid, and asbestos fibers.

5. A method of producing a composition of matter for making horse pads and other articles, which consists in mixing rubber and vulcanizable fibers, and condensing and vulcanizing the mixture.

6. A method of manufacturing a composition of matter for making horse pads and other articles, which consists in saturating textile fabric with rubber, de-fibering the fabric to produce rubber saturated fibers, mixing said rubber saturated fibers with rubber, and condensing the mixture under heavy pressure.

7. A method of manufacturing a composition of matter for making horse pads and other articles which consists in saturating and coating textile fabric with rubber, de-fibering the fabric to produce rubber saturated fibers, mixing said rubber saturated fibers with rubber, and condensing the mixture under heavy pressure.

8. A method of producing a composition of matter for making horse pads and other articles which consists in de-fibering rubber saturated fabric to produce vulcanizable fibers, mixing rubber with said vulcanizable fibers, and condensing and vulcanizing the mixture.

9. A method of manufacturing a composition of matter for making horse pads and other articles which consists in de-fibering rubber saturated fabric to produce vulcanizable fibers, mixing new and reclaimed rubber, antimony, lime, magnesia, zinc oxid and sulfur therewith, and vulcanizing and condensing the mixture.

10. A method of manufacturing a composition of matter for making horse pads and other articles which consists in mixing new and reclaimed rubber, vulcanizable fibers, antimony, lime, magnesia, zinc oxid, and sulfur, and condensing and vulcanizing the mixture thus produced.

11. A method of manufacturing a composition of matter for use in making horse pads and the like which consists in making a batch containing five parts of new rubber, three parts of reclaimed rubber, five parts of antimony, one part of lime, two parts of magnesia, one part of zinc oxid and five parts of sulfur, sheeting out the batch, stamping out the horse pads, and then vulcanizing and condensing the individual pads.

In testimony that I claim the foregoing as my own, I have hereto affixed my signature in the presence of two witnesses.

FRANKLIN W. KREMER.

Witnesses:
SELINA WILLSON,
J. PERCY CAMPBELL.